US006459693B1

(12) United States Patent
Park et al.

(10) Patent No.: US 6,459,693 B1
(45) Date of Patent: Oct. 1, 2002

(54) DEVICE AND METHOD FOR CANCELLING CODE INTERFERENCE IN A CDMA COMMUNICATION SYSTEM

(75) Inventors: Su-Won Park; Jae-Min Ahn; Young-Ky Kim, all of Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/348,701

(22) Filed: Jul. 7, 1999

(30) Foreign Application Priority Data

Jul. 7, 1998 (KR) .......................................... 98-27736

(51) Int. Cl.[7] .............................................. H04B 7/216
(52) U.S. Cl. ...................... 370/342; 370/208; 375/144; 375/148
(58) Field of Search ................................ 370/206, 208, 370/209, 320, 335, 342, 441; 375/142, 144, 148, 150; 455/67.1, 67.3, 226.1

(56) References Cited

U.S. PATENT DOCUMENTS 5,103,459 A * 4/1992 Gilhousen et al. .......... 370/206
5,319,672 A * 6/1994 Sumiya et al. .............. 375/142
5,521,937 A * 5/1996 Kondo et al. ............... 375/144
6,324,171 B1 * 11/2001 Lee et al. .................... 370/342
6,377,539 B1 * 4/2002 Kamg et al. ................ 370/209

* cited by examiner

Primary Examiner—Nay Maung
Assistant Examiner—Quochien B. Vuong
(74) Attorney, Agent, or Firm—Dilworth & Barrese, LLP

(57) ABSTRACT

A device and method for cancelling code interference in a receiver of a CDMA (Code Division Multiple Access) communication system simultaneously using orthogonal codes and quasi-orthogonal codes are provided. In a receiver according to an embodiment of the present invention, a channel estimator produces a channel estimation value of a pilot channel signal spread by an orthogonal code through despeading. A quasi-orthogonal channel receiver receives a channel signal spread by a quasi-orthogonal code, despreads the channel signal, demodulates the despread channel signal by use of the channel estimation value, and provides an output. An interference estimator estimates an interference value of the pilot channel signal with the channel signal spread by the quasi-orthogonal code by obtaining a correlation value between the orthogonal code corresponding to a pilot channel and the quasi-orthogonal code corresponding to a quasi-orthogonal channel. An interference canceller cancels the estimated interference from the output of the quasi-orthogonal channel receiver.

15 Claims, 6 Drawing Sheets

DEVICE AND METHOD FOR CANCELLING CODE INTERFERENCE IN A CDMA COMMUNICATION SYSTEM

BACKGROUND OF THE INVENTION

1. Field of the Invention

The present invention relates to a device and method for cancelling code interference in a CDMA (Code Division Multiple Access) communication system, and more particularly, to a device and method for cancelling mutual interference between orthogonal codes and quasi-orthogonal codes (QOCs) in a CDMA communication system where the orthogonal codes coexist with the quasi-orthogonal codes.

2. Description of the Related Art

In a CDMA communication system, orthogonal codes provide orthogonal channelization among all code channels, and the maximum number of available code channels is determined by the length of the longest orthogonal code. Walsh codes are typical orthogonal codes used in a CDMA system, and thus any reference to orthogonal codes herein below refers to Walsh codes. If an orthogonal channel with orthogonality is assigned as dedicated to a transmitter/receiver from a call set-up to a call release, the number of available channels becomes limited and channels may not be available for assignment to every subscriber. To allow all subscribers to use the CDMA system, quasi-orthogonal codes are used due to their minimal loss of orthogonality relative to other codes, even though they lack full orthogonality.

A quasi-orthogonal code is generated by EX-ORing the longest orthogonal code used in the system with a quasi-orthogonal code mask as long as the longest orthogonal code in order to minimize orthogonality loss. U.S. Ser. No. 09/149,924 filed on Sep. 9, 1998 describes binary Quasi-orthogonal code mask generation, quasi-orthogonal code generation and the usage of Quasi-orthogonal codes. Quasi-orthogonal codes are characterized in that orthogonality between orthogonal code symbols using the same quasi-orthogonal code mask is maintained and orthogonality loss between quasi-orthogonal codes using different quasi-orthogonal code masks is minimized.

W
F1 XOR W
F2 XOR W
F3 XOR W
•
•
•
FM XOR W where W=an N×N Walsh matrix and $F_{i=a}$ 1×N row vector.

(1) 16-ary quasi-orthogonal masks of size 512 are:
F1=77B4B477 774BB488 87BB4478 78BBBB78
 77B44B88 774B4B7778444478 8744BB78
 77B4B477 774BB488 87BB4478 78BBBB78
 77B44B88 774B4B77 78444478 8744BB78
F2=7E4DDBE8 17244D7E D41871BD 428E18D4
 D4E77142 BD8EE7D4 7EB2DB17 E824B27E
 7E4DDBE8 17244D7E D41871BD 428E18D4
 D4E77142 BD8EE7D4 7EB2DB17 E824B27E
F3=417214D8 7DB1281B EB274172 D7E47DB1
 B17DE4D7 8DBED814 1B28B17D 27EB8DBE
 417214D8 7DB1281B EB274172 D7E47DB1
 B17DE4D7 8DBED814 1B28B17D 27EB8DBE
F4=144EE441 B114BEE4 4EEBBEE4 144E1BBE
 8D287D27 D78DD87D D78D2782 72D77D27
 144EE441 B114BEE4 4EEBBEE4 144E1BBE
 8D287D27 D78DD87D D78D2782 72D77D27
F5=488B7B47 1DDED1ED B88474B7 EDD1DE1D
 122EDE1D 477B74B7 1DDE2EI2 488B84B8
 488B7B47 1DDED1ED B88474B7 EDD1DE1D
 122EDE1D 477B74B7 1DDE2E12 488B84B8
F6=1DB78BDE D17B4712 1D488B21 2E7BB812
 2E7B47ED 1D4874DE D17BB8ED IDB77421
 1DB78BDE D17B4712 ID488B21 2E7BB812
 2E7B47ED 1D4874DE D17BB8ED 1DB77421

(2) 16-ary quasi-orthogonal code masks of size 256 are:
F1=77B4B477 774BB488 87BB4478 78BBBB78
 77B44B88 774B4B77 78444478 8744BB78
F2=7E4DDBE8 17244D7E D41871BD 428E18D4
 D4277142 BD8EE7D4 7EB2DB17 E824B27E
F3=417214D8 7DB1281B EB274172 D7E47DB1
 B17DE4D7 8DBED814 1B28B17D 27EB8DBE
F4=144EE441 B114BEE4 4EEBBEE4 144E1BBE
 8D287D27 D78DD87D D78D2782 72D77D27
F5=488B7B47 1DDED1ED B88474B7 EDD1DE1D
 122EDE1D 477B74B7 1DDE2E12 488B84B8
F6=1DB78BDE D17B4712 1D488B21 2E7BB812
 2E7B47ED 1D4874DE D17BB8ED 1DB77421

(3) 16-ary quasi-orthogonal masks of size 128 are:
F1=17DBBD71 E8DB4271 17DBBD71 E8DB4271
F2=72824EBE BEB17D72 72824EBE BEB17D72
F3=2DEE87BB 8744D2EE 2DEE87BB 8744D2EE (4) 16-ary quasi-orthogonal masks of size 64 are:
F1=17DBBD71 E8DB4271
F2=72824EBE BEB17D72
F3=2DEE87BB 8744D2EE Correlation values between quasi-orthogonal codes generated by using the above quasi-orthogonal code masks and Walsh codes are listed in Table 1.

TABLE 1

| QOCS | Walsh codes | | | | | | | |
|---|---|---|---|---|---|---|---|---|
| | 512 | 256 | 128 | 64 | 32 | 16 | 8 | 4 |
| 512 | 0, ∓32 | ∓16 | 0, ∓16 | ∓8 | 0, ∓8 | ∓4 | 0, ∓4 | ∓2 |
| 256 | — | ∓16 | 0, ∓16 | ∓8 | 0, ∓8 | ∓4 | 0, ∓4 | ∓2 |
| 128 | — | — | 0, ∓16 | ∓8 | 0, ∓8 | ∓4 | 0, ∓4 | ∓2 |
| 64 | — | — | — | ∓8 | 0, ∓8 | ∓4 | 0, ∓4 | ∓2 |

Basic orthogonal codes are defined as orthogonal codes EX-ORed with the quasi-orthogonal code masks to generate quasi-orthogonal codes and to indicate Walsh codes. The Walsh codes may be from different layers of different lengths only if they ensure orthogonal channelization among code channels. However, to make the best use of the correlation characteristics as given by Table 1, it is preferable that the lowest-layer Walsh codes or longest Walsh codes be used as the basic orthogonal codes. Herein, the length of the basic orthogonal codes is defined as L.

FIG. 1 is a schematic block diagram of a transmitter in a CDMA communications system using the above quasi-orthogonal codes. Referring to FIG. 1, reference numerals 140 and 170 denote typical channel encoders and interleavers. Signal mappers 112, 142, and 172 change 0s and 1s of input data to signal levels +1s and −1s, respectively. Demultiplexers 144 and 174 separate traffic channel data into I-channel data and Q-channel data for QPSK (Quadrature Phase Shift Keying) transmission. The demultiplexers 144 and 174 may be serial-to-parallel converters (SPCs). In the case of BPSK (Binary Phase Shift Keying) modulation of the traffic channel data, the demultiplexers 144 and 174 are omitted and data is sent on an I channel and a Q channel.

A Walsh code symbol W #0 generator 116 generates a Walsh code symbol W #0 as being a basic orthogonal code to spread a pilot channel. The pilot channel is used for channel estimation in a receiver. A mixer 118 multiplies the output of the Walsh code symbol W #0 generator 116 by the output of the signal mapper 112 for orthogonal spreading of the pilot channel signal, and feeds the orthogonally spread pilot channel signal to an adder 162. A Walsh code symbol W #A generator 146 generates a Walsh code symbol W #A as being a basic orthogonal code. Mixers 148 and 158 multiply the output of the Walsh code symbol W #A generator 146 by I channel data and Q channel data received from the demultiplexer 144 to produce a spread signal. Gain controllers 150 and 160 control the relative gain of a traffic channel relative to the pilot channel.

A Walsh code symbol W #a generator 176 generates a Walsh code symbol W #a as being a basic orthogonal code. A quasi-orthogonal code mask M #m generator 186 generates a quasi-orthogonal code mask used to generate a quasi-orthogonal code from a basic orthogonal code. Mixers 178 and 188 multiply the outputs of the Walsh code symbol W #a generator 176 and the quasi-orthogonal code mask M #m generator 186, thereby producing a quasi-orthogonal code symbol Q[m]#a which belongs to a quasi-orthogonal code Q[m] and spreads the quasi-orthogonal code symbol Q[m] by multiplying the quasi-orthogonal code symbol Q[m] by the I channel and Q channel data received from the demultiplexer 174. Gain controllers 180 and 190 control the relative gain of the traffic channel spread by a quasi-orthogonal code relative to the pilot channel. Adders 162 and 192 add the I channel signals and Q channel signals, respectively, and output S_I[n] and S_Q[n]. A PN (Pseudo Noise) code generator 120 generates two PN sequences PN_I[n] and PN_Q[n] for complex PN spreading. A complex PN spreader 130 performs the following complex PN spreading on the outputs of the adders 162 and 192 with the output of the PN code generator 120.

$$(S\_I[n]+jS\_Q[n])(PN\_I[n]+jPN\_Q[n])=(S\_I[n]PN\_I[n]-S\_Q[n]PN\_Q[n])+j(S\_I[n]PN\_Q[n]+S\_Q[n]PN\_I[n])$$

The I channel signal (S_I[n]PN_I[n]−S_Q[n]PN_Q[n]) and the Q channel signal (S_I[n]PN_Q[n]+S_Q[n]PN_I[n]) of the complex PN spread signal are applied to the inputs of low pass filters (LPFs) 164 and 194, respectively. Amplifiers 166 and 196 adjust the magnitude of a transmit signal to an intended level. A carrier generator 122 generates a carrier needed to upconvert the frequency of the transmit signal to a high frequency. A 90° phase shifter 124 produces a 90°-phase difference between the I channel and the Q channel. Mixers 168 and 192 multiply the outputs of the amplifiers 166 and 196 by the carrier for modulation of the transmit signal. An adder 126 adds the modulated I channel and Q channel signals and a transmission antenna 128 transmits the output of the adder 126.

FIG. 2 is a block diagram of a conventional receiver in the CDMA system using the quasi-orthogonal codes. A reception antenna 228 receives a modulated signal from a transmitter. A carrier generator 222 generates a carrier necessary to downconvert the frequency of the received signal to a baseband frequency. A 90° phase shifter 224 produces a 90°-phase difference between an I channel and a Q channel. Mixers 268 and 298 multiply the received signal by the carrier for demodulation, and LPFs 264 and 294 remove high frequency components generated during the demodulation and pass only baseband signals.

Generally, a plurality of paths exist in which a signal transmitted from a transmitter can reach a receiver in the mobile radio environment. However, a signal reception mechanism is identical for each path. Accordingly, a description of a signal reception mechanism will herein be described with reference to one path.

A PN (Pseudo Noise) code generator 220 generates PN sequences PN_I[n] and PN_Q[n] which are synchronized with the received signal through demodulation. A complex PN despreader 230 computes the low-pass-filtered signals and the PN sequences by the following arithmetic procedure:

$$(S\_I[n]PN\_I[n]-S\_Q[n]PN\_Q[n])+j(S\_I[n]PN\_Q[n]+S\_Q[n]PN\_I[n])(PN\_I[n]+jPN\_Q[n])=$$

$$(S\_I[n]+jS\_Q[n])(PN\_I[n]+jPN\_Q[n])(PN\_I[n]+jPN\_Q[n])=S\_I[n]+jS\_Q[n]$$

A channel estimator 210 performs channel estimation for each path using a pilot channel spread by a Walsh code symbol W #0. A Walsh code symbol W #0 generator 216 generates the Walsh code symbol W #0. A mixer 214 complex-multiplies the output of the complex PN despreader 230 by the output of the Walsh code symbol W #0 generator 216. An accumulator 212 accumulates the output of the mixer 214 for every predetermined time period to extract a channel estimation value. For this purpose, the accumulator 212 can be replaced with an LPF. The channel estimation value is used to demodulate a traffic channel. The traffic channel data is obtained by multiplying the output of the complex PN despreader 230 by a quasi-orthogonal code symbol Q[m] #a for the traffic channel.

A mixer 254 multiplies the output of a Walsh code symbol W #a generator 276 by the output of a quasi-orthogonal code mask M #m generator 286 to produce the quasi-orthogonal code symbol Q[m]#a, and then multiplies the quasi-orthogonal code symbol Q[m] #a by the output of the complex PN despreader 230. An accumulator 252 accumulates the output of the mixer 254 in data symbol units. A delay 250 delays the output of the accumulator 252 by the time required for the channel estimation in the channel estimator 210. A complex conjugator 206 generates the complex conjugate of the channel estimation value received from the channel estimator 210 for demodulation. A mixer 204 produces a demodulated signal by multiplying the complex conjugate of the channel estimation value by the output of the delay 250.

A combiner 202 combines demodulated multipath signals through the above reception mechanism. A deinterleaver and channel decoder 200 deinterleaves and channel decodes the output of the combiner 202.

The above conventional receiver experiences orthogonality loss between channels due to the coexistence of orthogonal codes with quasi-orthogonal codes. Accordingly, it is impossible to reduce mutual interference between the orthogonal codes and the quasi-orthogonal codes.

SUMMARY OF THE INVENTION

An object of the present invention is to provide a device and method for cancelling interference of a signal received by a receiver in a CDMA communication system.

Another object of the present invention is to provide a device and method for cancelling interference of an orthogonal code with a quasi-orthogonal code caused by orthogonality loss of a signal received by a receiver in a CDMA communication system where the orthogonal codes coexist with the quasi-orthogonal codes.

A further object of the present invention is to provide a device and method for cancelling interference of a quasi-orthogonal code with an orthogonal code caused by orthogonality loss of a signal received by a receiver in a CDMA communication system where the orthogonal codes coexist with the quasi-orthogonal codes.

To achieve the above objects, a receiver is provided in a CDMA communication system which simultaneously uses orthogonal codes and quasi-orthogonal codes. In a receiver according to an embodiment of the present invention, a channel estimator produces a channel estimation value of a pilot channel signal spread by an orthogonal code through despeading. A quasi-orthogonal channel receiver receives a channel signal spread by a quasi-orthogonal code, despreads the channel signal, demodulates the despread channel signal by use of the channel estimation value, and provides an output. An interference estimator estimates an interference value of the pilot channel signal with the channel signal spread by the quasi-orthogonal code by obtaining a correlation value between the orthogonal code corresponding to a pilot channel and the quasi-orthogonal code corresponding to a quasi-orthogonal channel. An interference canceller cancels the estimated interference from the output of the quasi-orthogonal channel receiver.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
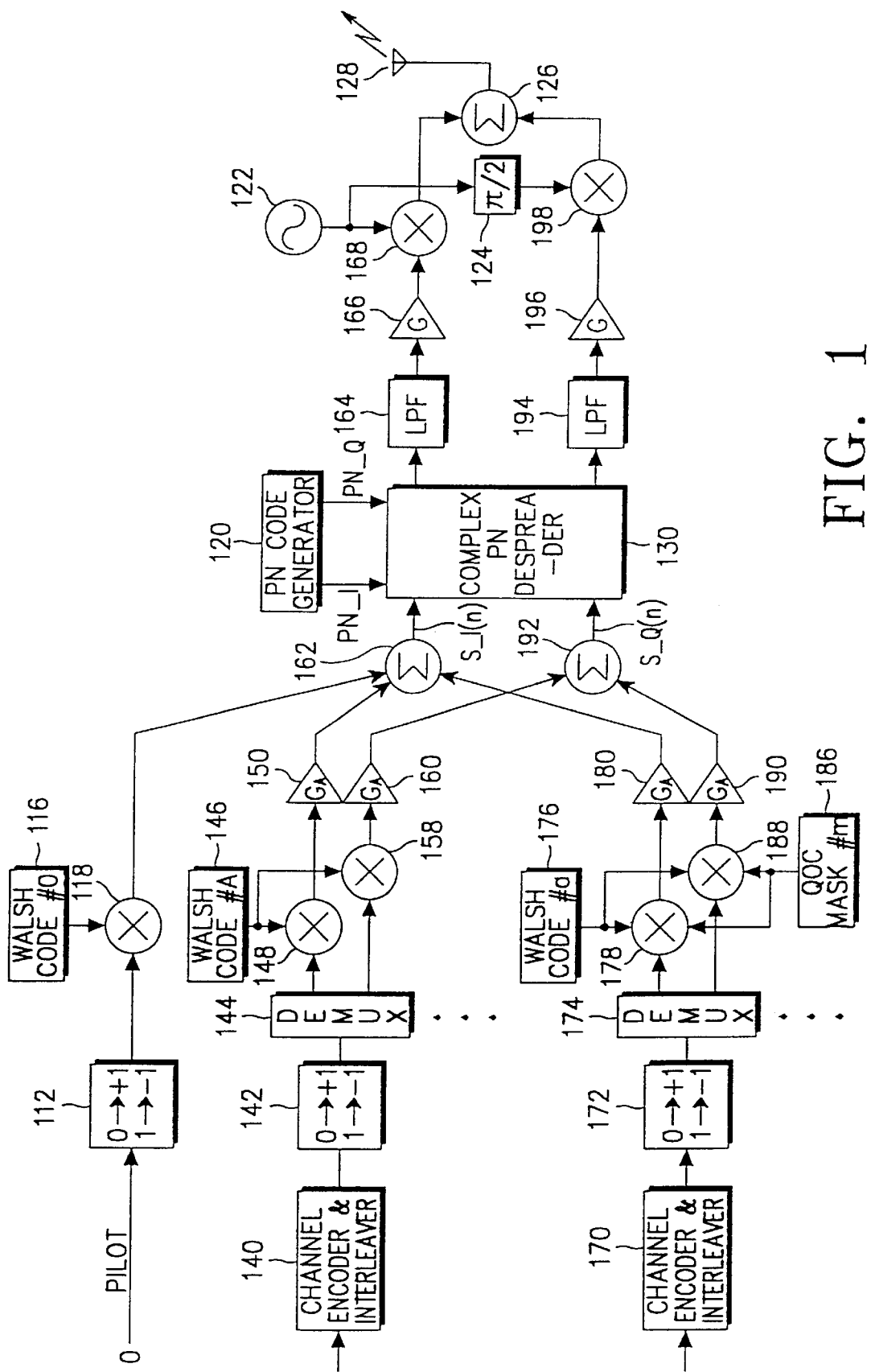
FIG. 1 is a block diagram of a prior art transmitter in a CDMA communication system using orthogonal codes and quasi-orthogonal codes.

Preferred embodiments of the present invention will be described in detail with reference to the attached drawings. Like reference numerals denote the same components in the drawings.

A receiver in the present invention cancels interference between orthogonal codes and quasi-orthogonal codes in a CDMA communication system by simultaneously using the orthogonal codes and the quasi-orthogonal codes. With the same transmit power for all transmitters in the CDMA system, reception quality can be improved and maintained by reducing the transmit powers of the transmitters.

Figure 3:
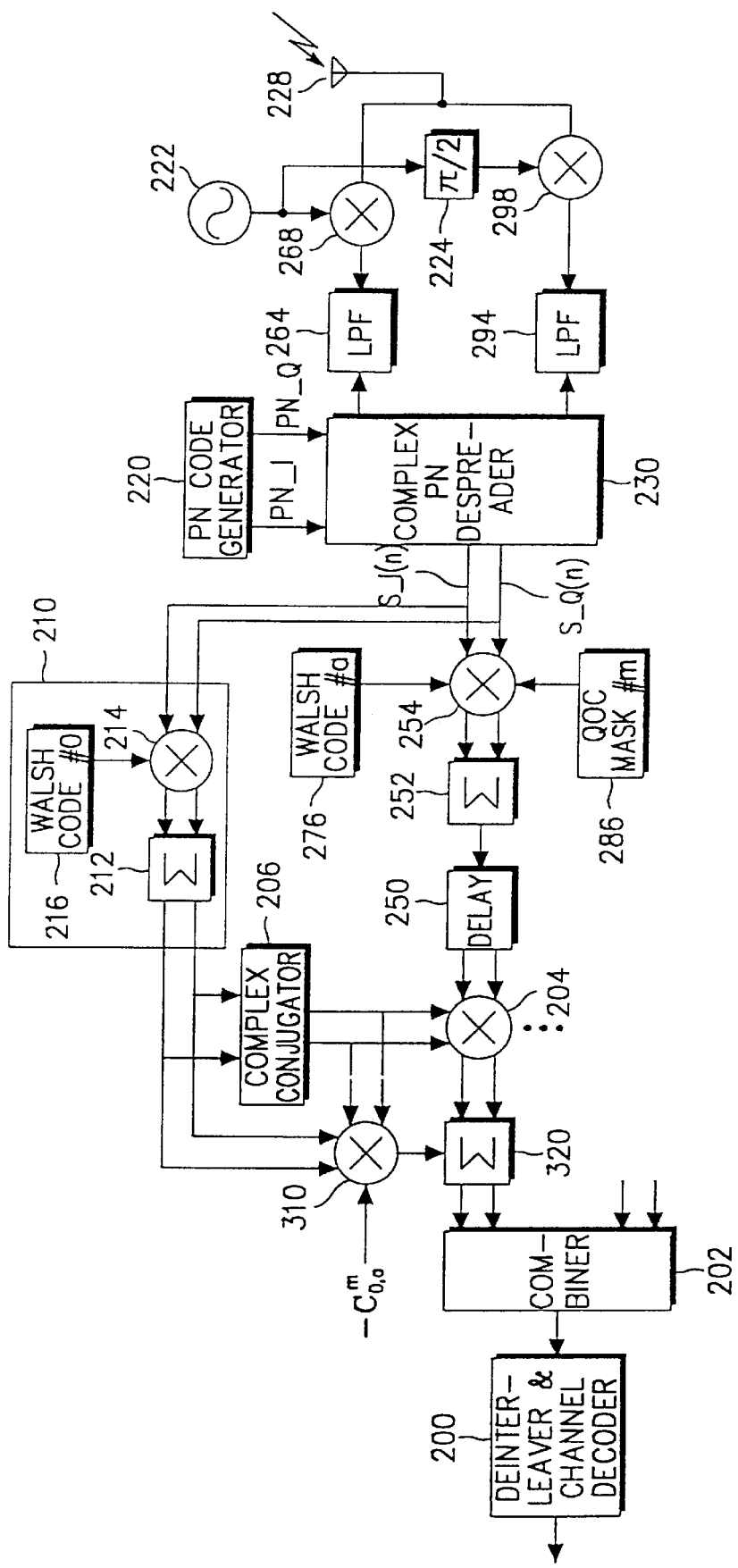
FIG. 3 is a block diagram of a receiver for cancelling interference of a pilot channel spread by an orthogonal code with a traffic channel spread by a quasi-orthogonal code according to a first embodiment of the present invention.

FIG. 3 is a block diagram of a receiver for cancelling interference of a pilot channel spread by an orthogonal code with a traffic channel spread by a quasi-orthogonal code according to a first embodiment of the present invention.

As described in the Background of the Invention section, the reception antenna 228 receives a modulated signal from a transmitter. The carrier generator 222 generates a carrier necessary to downconvert the frequency of the received signal to a baseband frequency. The 90° phase shifter 224 produces a 90°-phase difference between an I channel and a Q channel. The mixers 268 and 298 multiply the received signal by the carrier for demodulation, and the LPFs 264 and 294 remove high frequency components generated during the demodulation and pass only baseband signals.

Generally, a plurality of paths exist in which a signal transmitted from a transmitter can reach a receiver in the mobile radio environment. However, a signal reception mechanism is identical for each path. Accordingly, a description of a signal reception mechanism will herein be described with reference to one path.

The PN code generator 220 generates PN sequences PN_I[n] and PN_Q[n] which are synchronized with the received signal through demodulation. The complex PN despreader 230 compute the low-pass-filtered signals and the PN sequences by the following arithmetic procedure:

$$(S\_I[n]PN\_I[n]-S\_Q[n]PN\_Q[n])+j(S\_I[n]PN\_Q[n]+S\_Q[n]\\PN\_I[n])(PN\_I[n]+jPN\_Q[n])=$$

$$(S\_I[n]+jS\_Q[n])(P\_N[n]+jPN\_Q[n])(PN\_I[n]+jPN\_Q[n])=S\_I\\{}[n]+jS\_Q[n]$$

The channel estimator 210 performs a channel estimation for each path using a pilot channel spread by a Walsh code symbol W #0. The Walsh code symbol W #0 generator 216 generates the Walsh code symbol W #0. The mixer 214 complex-multiplies the output of the complex PN despreader 230 by the output of the Walsh code symbol W #0 generator 216. The accumulator 212 accumulates the output of the mixer 214 for every predetermined time period to extract a channel estimation value. For this purpose, the accumulator 212 can be replaced with an LPF. The channel estimation value is used to demodulate a traffic channel. The traffic channel data is obtained by multiplying the output of the complex PN despreader 230 by a quasi-orthogonal code symbol Q[m] #a for the traffic channel.

The mixer 254 multiplies the output of the Walsh code symbol W #a generator 276 by the output of the quasi-orthogonal code mask M #m generator 286 to produce the quasi-orthogonal code symbol Q[m] #a, and then multiplies the quasi-orthogonal code symbol Q[m] #a by the output of the complex PN despreader 230. The accumulator 252 accumulates the output of the mixer 254 in data symbol units. The delay 250 delays the output of the accumulator 252 by the time required for the channel estimation in the channel estimator 210. The complex conjugator 206 generates the complex conjugate of the channel estimation value received from the channel estimator 210 for demodulation. The mixer 204 produces a demodulated signal by multiplying the complex conjugate of the channel estimation value by the output of the delay 250.

A mixer 310 produces the square of the channel estimation value by multiplying the channel estimation value by the complex conjugate to obtain the energy of the channel estimation value. The mixer 310 multiplies the product of the channel estimation and the complex conjugate by $-C_{0,a}{}^m$ where $C_{0,a}{}^m$ is a correlation value between the Walsh code symbol W #0 and the quasi-orthogonal code symbol Q[m] #a. The output of the mixer 310 is an interference component of the channel using the Walsh code symbol W #0 with the traffic channel using the quasi-orthogonal code symbol Q[m] #a.

An adder 320 removes the estimated value of the interference from the demodulated traffic channel signal received from the mixer 204. Therefore, the adder 320 functions to cancel the interference of the channel spread by the Walsh code symbol W #0 with the traffic channel spread by the quasi-orthogonal code symbol Q[m] #a, and an interference-free signal is applied to the input of a combiner 202. The combiner 202 combines demodulated multipath signals through the above reception mechanism. A deinterleaver and channel decoder 200 deinterleaves and channel decodes the output of the combiner 202.

As described above, the mixer 310 multiplies the channel estimation value by its complex conjugate to produce the square of the channel estimation value output from the channel estimator 210 and then by $-C_{0,a}{}^m$, where $C_{0,a}{}^m$ is defined as follows:

Equation 1:

$$C_{i,j}^m = \sum_{k=0}^{L-1} (W_{i,k} \cdot Q_{j,k}^m) = \sum_{k=0}^{L-1} \left[ W_{i,k} \cdot \left( M_k^{m \cdot W_{j,k}} \right) \right]$$

Then, the adder 320 removes the estimated value of the interference of the channel with the traffic channel from the demodulated traffic channel signal. The interference-free signal is input to the combiner 202 as in the prior art. In accordance with the first embodiment of the present invention, the receiver as shown in FIG. 3 estimates the interference of the channel with the channel using a quasi-orthogonal code and then cancels the estimated interference from the channel using the demodulated quasi-orthogonal code.

Figure 2:
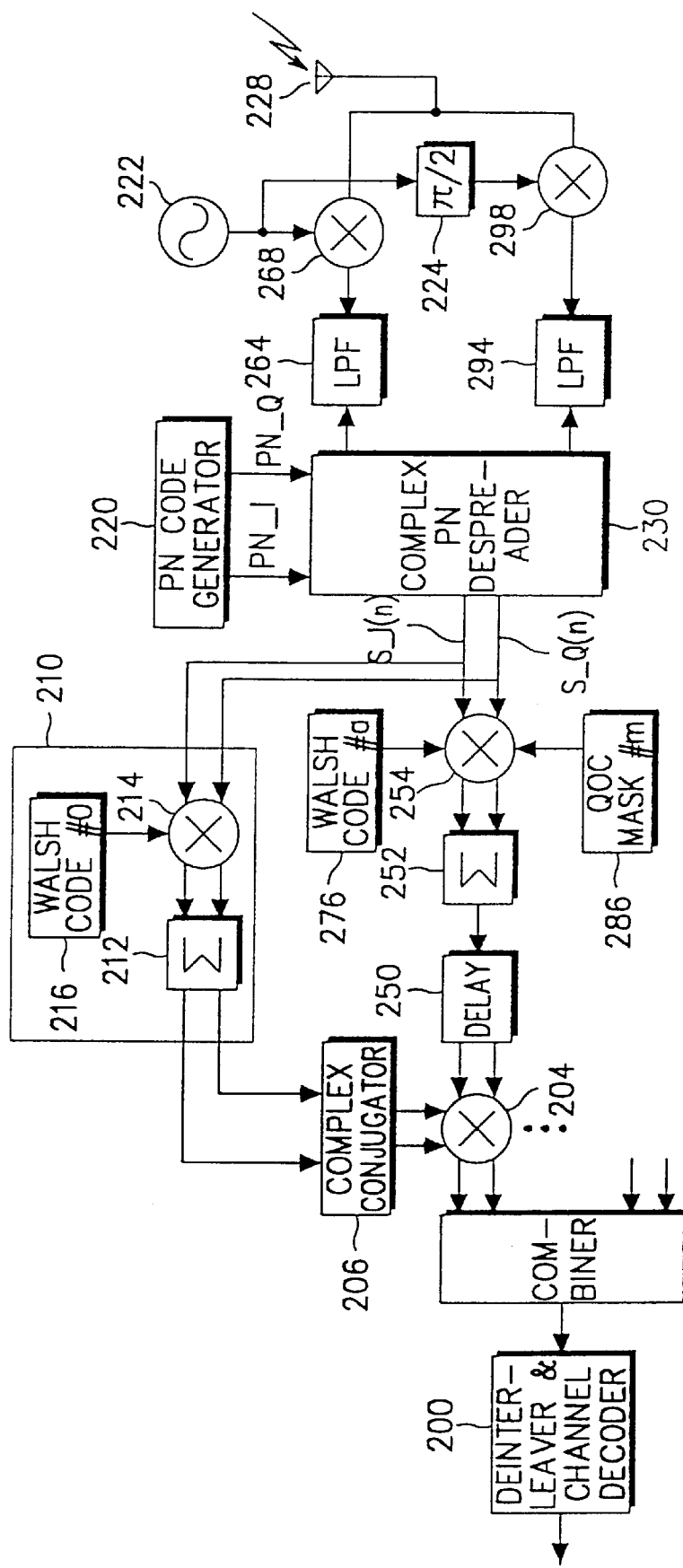
FIG. 2 is a block diagram of a prior art receiver in a CDMA communication system using orthogonal codes and quasi-orthogonal codes.

The receiver performs the overall procedure except for the above interference cancellation in the same manner as the receiver of FIG. 2.

Figure 4:
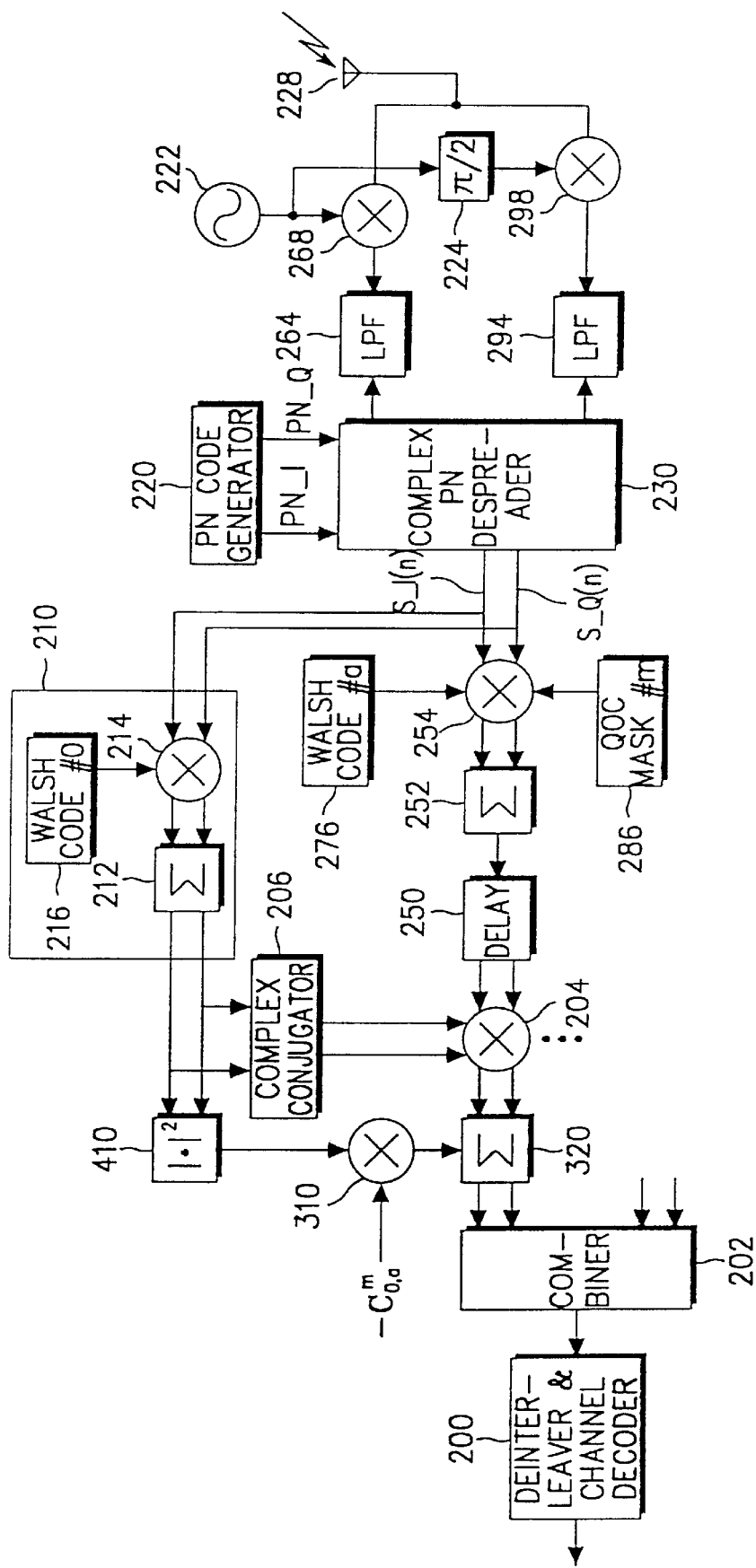
FIG. 4 is a block diagram of a receiver for cancelling interference of a pilot channel spread by an orthogonal code with a traffic channel spread by a quasi-orthogonal code according to a second embodiment of the present invention.

FIG. 4 is a block diagram of a receiver for cancelling interference of a pilot channel spread by an orthogonal code with a traffic channel spread by a quasi-orthogonal code according to a second embodiment of the present invention. The receiver of FIG. 4 is the same as that of FIG.3 in structure and operation, except that the former includes a device 410 for deriving the square of a channel estimation value directly from the channel estimation value.

Figure 5:
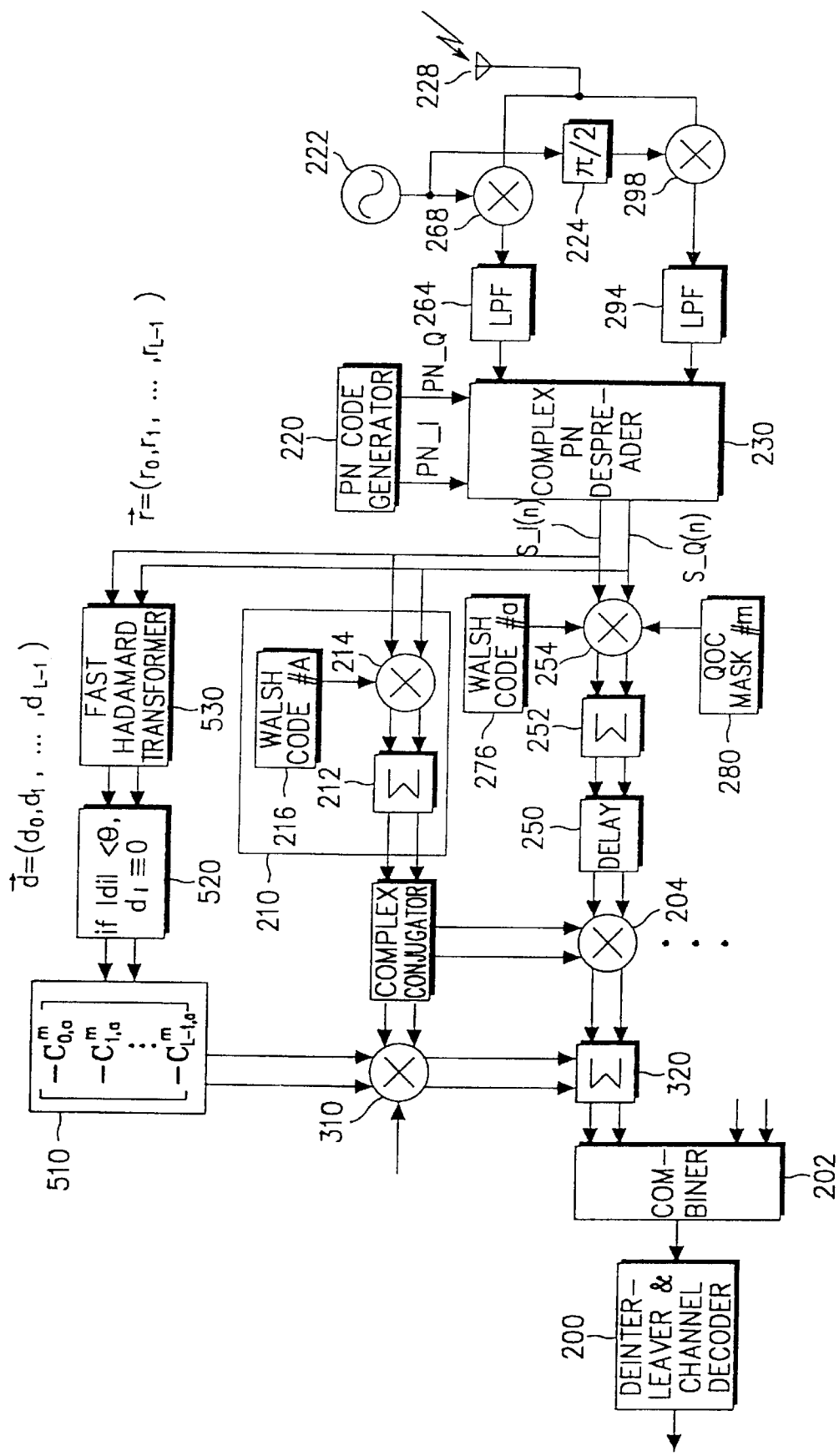
FIG. 5 is a block diagram of a receiver for cancelling interference of a channel spread by an orthogonal code with a traffic channel spread by a quasi-orthogonal code according to a third embodiment of the present invention.

FIG. 5 is a block diagram of a receiver for cancelling interference of a channel spread by an orthogonal code with a traffic channel spread by a quasi-orthogonal code according to a third embodiment of the present invention. A description of the receiver shown in FIG. 5 will be given mainly regarding the cancellation of interference of the orthogonal code using the channel with the quasi-orthogonal code using the traffic channel. A description of the general operation of the receiver is omitted.

A fast Hadamard transformer 530 computes the output of the complex PN despreader 230 according to the following equation:

Equation 2:

$$(d_0, d_1, \ldots, d_{L-1}) = (\gamma_0, \gamma_1, \ldots \gamma_{L-1}) \begin{bmatrix} W_{0,0} & W_{1,0} & \ldots & W_{L-1,0} \\ W_{0,1} & W_{1,1} & \ldots & W_{L-1,1} \\ \vdots & \vdots & \vdots & \vdots \\ W_{0,L-1} & W_{1,L-1} & \ldots & W_{L-1,L-1} \end{bmatrix}$$

In the CDMA communication system, all of the basic orthogonal codes as defined by Equation 2 are not used. Hence, an output of the fast Hadamard transformer 530 for input of a Walsh code symbol which is not in use is induced from noise. This noise component has a smaller value than a Walsh code symbol in use. Therefore, a decider 520 compares the output of the fast Hadamard transformer 530 with a predetermined value θ and decides the former to be noise if the former is smaller than the latter. If the Walsh code symbol is smaller than the predetermined value θ, the value of the Walsh code symbol is determined to be zero, to thereby reduce the influence of the noise (if $|d_i|<0$, $d_i=0$).

Then, an operator 510 multiplies a vector of the output of the decider 520 by a vector of the product of (−1) and a correlation value between the quasi-orthogonal code Q[m] #a for the traffic channel and its corresponding Walsh code using Equation 3:

Equation 3:

$$(d_0, d_1, \ldots, d_{L-1}) \begin{bmatrix} -C_{0,a}^m \\ -C_{1,a}^m \\ \vdots \\ -C_{L-1,a}^m \end{bmatrix} = -\sum_{i=0}^{L-1} di \cdot C_{i,a}^m$$

where m is a quasi-orthogonal code mask number, α is a basic orthogonal code used to generate a quasi-orthogonal code, and L is the length of an orthogonal code.

Figure 6:
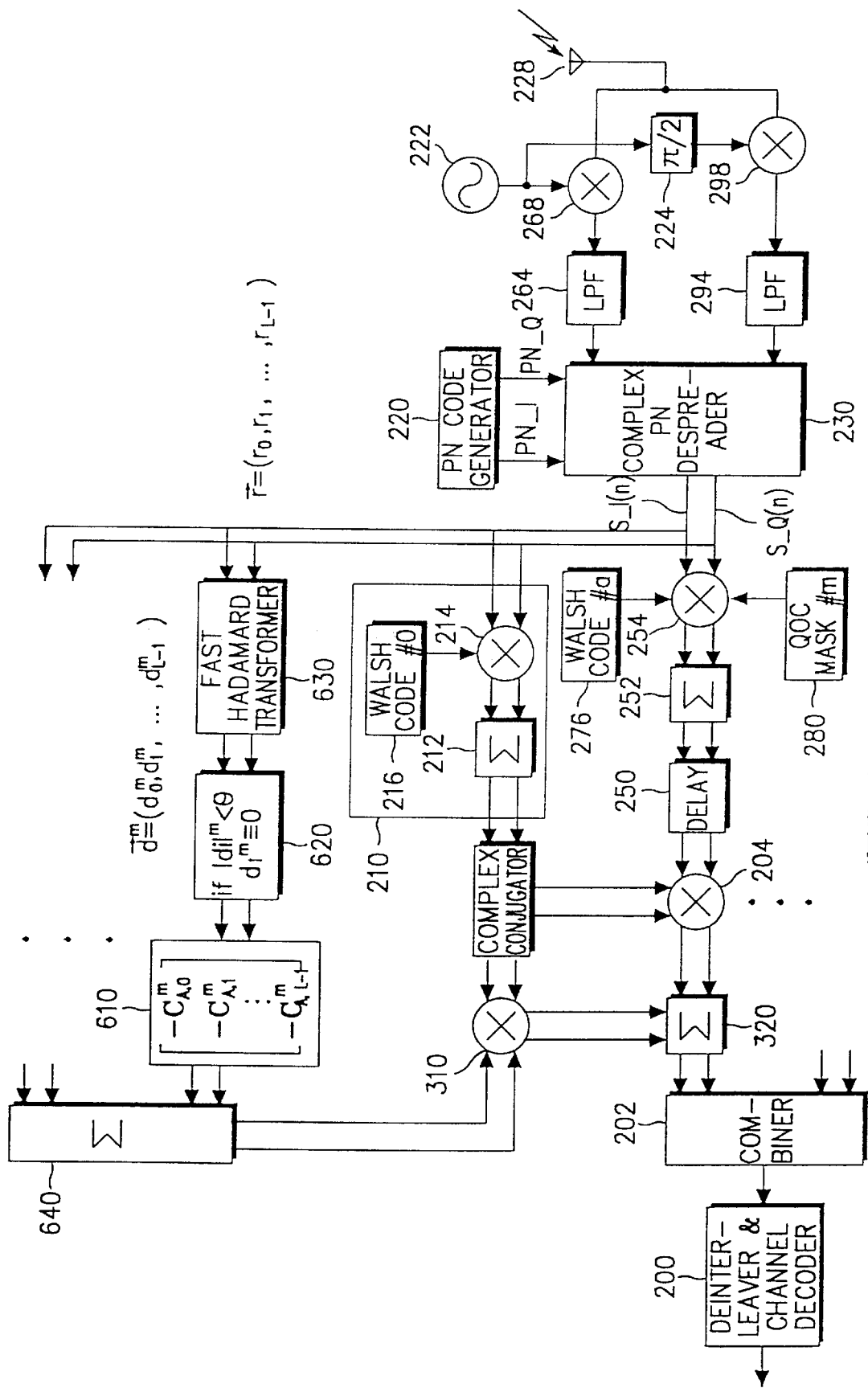
FIG. 6 is a block diagram of a receiver for cancelling interference of a channel spread by a quasi-orthogonal code with a traffic channel spread by an orthogonal code according to a fourth embodiment of the present invention.

The mixer 310 multiplies the complex conjugate of a channel estimation value received from the complex conjugator 206 by the output of the operator 510. The output of the mixer is an estimated interference value of a plurality of orthogonal code channels with a quasi-orthogonal code channel. Then, the adder 320 cancels the interference of the Walsh code using the channel with the quasi-orthogonal code using the traffic channel by adding the output of the mixer 310 and the demodulated traffic channel signal received from the mixer 204. The interference-free quasi-orthogonal code using the traffic channel signal is then applied to the input of the combiner 202. FIG. 6 is a block diagram of a receiver for cancelling interference of a channel spread by a quasi-orthogonal code with a traffic channel spread by a Walsh code according to a fourth embodiment of the present invention. The quasi-orthogonal code mask generator 286 of FIG. 5 is absent in the receiver of FIG. 6, which is intended to receive information of the Walsh code using the traffic channel. A fast Hadamard transformer 630 computes the output of the complex PN despreader 230 according to Equation 4:

Equation 4:

$$(d_0^m, d_1^m, \ldots, d_{L-1}^m) = (\gamma_0, \gamma_1, \ldots \gamma_{L-1}) \begin{bmatrix} W_{0,0}^m & W_{1,0}^m & \ldots & W_{L-1,0}^m \\ W_{0,1}^m & W_{1,1}^m & \ldots & W_{L-1,1}^m \\ \vdots & \vdots & \vdots & \vdots \\ W_{0,L-1}^m & W_{1,L-1}^m & \ldots & W_{L-1,L-1}^m \end{bmatrix}$$

As described with respect to FIG. 5, all of the quasi-orthogonal codes as defined in Equation 4 are not used by the CDMA communication system. Hence, an output of the fast Hadamard transformer 630 for input of a Walsh code symbol which is not in use is induced from noise. This noise component has a smaller value than a quasi-orthogonal code symbol in use. Therefore, a decider 620 compares the output of the fast Hadamard transformer 630 with a predetermined value θ and decides the former to be noise if the former is smaller than the latter. If the quasi-orthogonal code symbol is smaller than the predetermined value θ, the value of the quasi-orthogonal code symbol is determined to be zero, to thereby reduce the influence of the noise (if $|d_i^m|<0$, $d_i^m=0$).

Then, an operator 610 multiplies a vector of the output of the decider 620 by a vector of the product of (−1) and a correlation value between a Walsh code symbol W # for the traffic channel and its corresponding quasi-orthogonal code using Equation 5:

Equation 5:

$$(d_0^m, d_1^m, \ldots, d_{L-1}^m) \begin{bmatrix} -C_{A,0}^m \\ -C_{A,1}^m \\ \vdots \\ -C_{A,L-1}^m \end{bmatrix} = -\sum_{i=0}^{L-1} d_i^m \cdot C_{A,i}^m$$

A plurality of quasi-orthogonal codes can be produced from one basic orthogonal code by use of different quasi-orthogonal code masks. The quasi-orthogonal codes can be used together with their respective corresponding orthogonal code in the system. If a plurality of quasi-orthogonal codes are used, the number of the above receiver mechanisms increases proportionally with the number of quasi-orthogonal code masks used. In this case, an adder 640 sums the products of (−1) and estimated interference values of quasi-orthogonal code using channels with the traffic channel using the Walsh code symbol W #A. The mixer 310 multiplies the complex conjugate of the channel estimation value received from the complex conjugator 206 by the output of the adder 640. Here, the output of the mixer 310 is an interference component of channels using quasi-orthogonal codes with their corresponding channel using an orthogonal code. Then, the adder 320 cancels the interference of the quasi-orthogonal code using channel with the Walsh code symbol W #A using traffic channel by adding the output of the mixer 310 and the demodulated traffic channel signal received from the mixer 204. The interference-free traffic channel signal is then applied to the input of the combiner 202.

As described above, the receiver of the present invention detects interference of an orthogonal code with a quasi-orthogonal code or vice versa, which is caused by orthogonality loss among channels and removes the interference from a corresponding channel in a CDMA communication system where orthogonal codes coexist with quasi-orthogonal codes. Thus, with the same transmit power for all transmitters, a better reception quality can be obtained at the receiver. Further, the same reception quality can be achieved by reducing the transmit power of a transmitter.

While the present invention has been described in detail with reference to the specific embodiments, they are mere exemplary applications. Thus, it is to be clearly understood that many variations can be made by anyone skilled in the art within the scope and spirit of the present invention as defined by the claims.

What is claimed is:

1. A receiver which simultaneously uses orthogonal codes and quasi-orthogonal codes in a CDMA (Code Division Multiple Access) communication system, said receiver comprising:

a channel estimator for producing a channel estimation value of a pilot channel signal spread by an orthogonal code through despeading;

a quasi-orthogonal channel receiver for receiving a channel signal spread by a quasi-orthogonal code, despreading the channel signal, demodulating the despread channel signal by use of the channel estimation value, and providing an output;

an interference estimator for estimating an interference value of the pilot channel signal with the channel signal spread by the quasi-orthogonal code by obtaining a correlation value between the orthogonal code corresponding to a pilot channel and the quasi-orthogonal code corresponding to a quasi-orthogonal channel; and an interference canceller for cancelling the estimated interference from the output of the quasi-orthogonal channel receiver.

2. The receiver of claim 1, wherein the interference canceller comprises:

a complex conjugator for calculating a complex conjugate of an output of the channel estimator;

a first multiplier for multiplying the output of the channel estimator by the complex conjugate; and a second multiplier for estimating the interference value of the pilot channel with the quasi-orthogonal channel by multiplying the correlation value by an output of the first multiplier.

3. The receiver of claim 1, wherein the interference canceller comprises:

a squarer for squaring an output of the channel estimator; and a multiplier for estimating the interference value of the pilot channel with the quasi-orthogonal channel by multiplying the correlation value by an output of the squarer.

4. The receiver of claim 1, wherein the correlation value is calculated as follows:

$$C_{i,j}^m = \sum_{k=0}^{L-1} (W_{i,k} \cdot Q_{j,k}^m) = \sum_{k=0}^{L-1} \left[ W_{i,k} \cdot \left( M_k^{m \cdot W_{j,k}} \right) \right]$$

where i is a Walsh code used for the pilot channel, j is a basic orthogonal code used to generate a quasi-orthogonal code, m is a quasi-orthogonal code mask, and L is the length of the orthogonal code.

5. A receiver which simultaneously uses orthogonal codes and quasi-orthogonal codes in a CDMA (Code Division Multiple Access) communication system, said receiver comprising:

a PN (Pseudo Noise) despreader for PN-despreading a received signal;

a quasi-orthogonal channel receiver for despreading the PN-despread signal by a quasi-orthogonal code;

an interference estimator for estimating an interference value of an orthogonal code used to generate the quasi-orthogonal code with a quasi-orthogonal channel from the PN-despread signal; and an interference canceller for cancelling the estimated interference value from an output of the quasi-orthogonal channel receiver.

6. The receiver of claim 5, wherein the interference estimator comprises:

a fast Hadamard transformer for detecting orthogonal code symbols which are not used and orthogonal code symbols which are used;

a decider for comparing an output of the fast Hadamard transformer with a predetermined value and removing the orthogonal code symbols which are not used; and an operator for multiplying a vector of an output of the decider by a vector of a correlation value between the quasi-orthogonal code of the quasi-orthogonal channel and a corresponding orthogonal code to generate the estimated interference value of the orthogonal code with the quasi-orthogonal channel.

7. The receiver of claim 6, wherein the fast Hadamard transformer detects the orthogonal code symbols which are not used by the following equation:

$$(d_0, d_1, \ldots, d_{L-1}) = (\gamma_0, \gamma_1, \ldots \gamma_{L-1}) \begin{bmatrix} W_{0,0} & W_{1,0} & \ldots & W_{L-1,0} \\ W_{0,1} & W_{1,1} & \ldots & W_{L-1,1} \\ \vdots & \vdots & \vdots & \vdots \\ W_{0,L-1} & W_{1,L-1} & \ldots & W_{L-1,L-1} \end{bmatrix}$$

and the operator estimates the interference value by the following equation:

$$(d_0, d_1, \ldots, d_{L-1}) \begin{bmatrix} -C_{0,a}^m \\ -C_{1,a}^m \\ \vdots \\ -C_{L-1,a}^m \end{bmatrix} = -\sum_{i=0}^{L-1} di \cdot C_{i,a}^m$$

where m is a quasi-orthogonal code mask number, α is a basic orthogonal code used to generate a quasi-orthogonal code, and L is the length of an orthogonal code.

8. The receiver of claim 6, wherein the interference canceller comprises:

a multiplier for multiplying an output of the operator by a complex conjugate of a pilot channel estimation value; and an adder for removing an output of the multiplier from the quasi-orthogonal channel receiver.

9. A receiver which simultaneously uses orthogonal codes and quasi-orthogonal codes in a CDMA (Code Division Multiple Access) communication system, said receiver comprising:

a PN despreader for PN-despreading a received signal;

an orthogonal channel receiver for despreading the PN-despread signal by an orthogonal code;

an interference estimator for estimating an interference value of the quasi-orthogonal code with a basic orthogonal code used to generate the quasi-orthogonal code from the PN-despread signal; and an interference canceller for cancelling the estimated interference value from an output of the orthogonal channel receiver.

10. The receiver of claim 9, wherein the interference estimator comprises:

a fast Hadamard transformer for distinguishing orthogonal code symbols which are not used and orthogonal code symbols which are used by operating on quasi-orthogonal code symbols of the PN-despread signal;

a decider for comparing an output of the fast Hadamard transformer with a predetermined value and removing the orthogonal code symbols which are not used; and an operator for multiplying a vector of an output of the decider by a vector of a correlation value between the orthogonal code of the orthogonal channel and a corresponding quasi-orthogonal code to generate the estimated interference value of the quasi-orthogonal code.

11. The receiver of claim 10, wherein the fast Hadamard transformer detects the orthogonal code symbols which are not used by the following equation:

$$(d_0^m, d_1^m, \ldots, d_{L-1}^m) = (\gamma_0, \gamma_1, \ldots \gamma_{L-1}) \begin{bmatrix} W_{0,0}^m & W_{1,0}^m & \ldots & W_{L-1,0}^m \\ W_{0,1}^m & W_{1,1}^m & \ldots & W_{L-1,1}^m \\ \vdots & \vdots & \vdots & \vdots \\ W_{0,L-1}^m & W_{1,L-1}^m & \ldots & W_{L-1,L-1}^m \end{bmatrix}$$

and the operator estimates the interference value by the following equation:

$$(d_0^m, d_1^m, \ldots, d_{L-1}^m) \begin{bmatrix} -C_{A,0}^m \\ -C_{A,1}^m \\ \vdots \\ -C_{A,L-1}^m \end{bmatrix} = -\sum_{i=0}^{L-1} d_i^m \cdot C_{A,i}^m$$

where m is a quasi-orthogonal code mask number, A is an orthogonal code used in the orthogonal channel receiver, and L is the length of the orthogonal code.

12. The receiver of claim 10, wherein the interference canceller comprises:

a multiplier for multiplying an output of the operator by a complex conjugate of a pilot channel estimation value; and an adder for removing an output of the multiplier from the orthogonal channel receiver.

13. A method of cancelling interference between codes in a receiver which simultaneously uses orthogonal codes and quasi-orthogonal codes in a CDMA communication system, comprising the steps of:

producing a channel estimation value of a pilot channel signal spread by an orthogonal code through despeading receiving a channel signal spread by a quasi-orthogonal code, despreading the channel signal, and demodulating the despread channel signal by use of the channel estimation value;

estimating an interference value of the pilot channel signal with the channel signal spread by the quasi-orthogonal code by obtaining a correlation value between the orthogonal code corresponding to a pilot channel and the quasi-orthogonal code corresponding to a quasi-orthogonal channel; and cancelling the estimated interference value from the demodulated quasi-orthogonal despread channel signal.

14. A method of cancelling interference between codes in a receiver which simultaneously uses orthogonal codes and quasi-orthogonal codes and receives a channel signal spread by a quasi-orthogonal code in a CDMA communication system, said method comprising the steps of:

distinguishing orthogonal code symbols which are not used and orthogonal code symbols which are used by means for fast-Hadamard-transforming orthogonal code symbols of a PN-despread signal;

comparing an output of the means for fast-Hadamard-transforming orthogonal code symbols with a predetermined value and removing the orthogonal code symbols which are not used;

multiplying a vector of a signal free of the orthogonal code symbols which are not used by a vector of a correlation value between a quasi-orthogonal code of a quasi-orthogonal channel signal and a corresponding orthogonal code and generating an estimated interference value of an orthogonal code with the quasi-orthogonal channel signal; and removing the estimated interference value from the quasi-orthogonal channel signal.

15. A method of cancelling interference between codes in a receiver which simultaneously uses orthogonal codes and quasi-orthogonal codes and receives a channel signal spread by an orthogonal code in a CDMA communication system, said method comprising the steps of:

distinguishing orthogonal code symbols which are not used and orthogonal code symbols which are used by means for fast-Hadamard-transforming quasi-orthogonal code symbols of a PN-despread signal;

comparing an output of means for fast-Hadamard-transforming with a predetermined value and removing the orthogonal code symbols which are not used;

multiplying a vector of a signal free of the orthogonal code symbols which are not used by a vector of a correlation value between a orthogonal code of an orthogonal channel signal and a corresponding quasi-orthogonal code and generating an estimated interference value of a quasi-orthogonal code with the orthogonal channel signal; and removing the estimated interference value from the orthogonal channel signal.

\* \* \* \* \*